SYSTEM FOR RECONSTITUTING A CARRIER REFERENCE SIGNAL USING A SWITCHABLE PHASE LOCK LOOP

Filed Aug. 14, 1968

INVENTOR
J.G. PUENTE

BY Sughrue, Rothwell, Mion, Zinn & Macpeak
ATTORNEYS

United States Patent Office 3,525,945
Patented Aug. 25, 1970

3,525,945

SYSTEM FOR RECONSTITUTING A CARRIER REFERENCE SIGNAL USING A SWITCHABLE PHASE LOCK LOOP

John G. Puente, Rockville, Md., assignor to Communications Satellite Corporation, Washington, D.C.
Filed Aug. 14, 1968, Ser. No. 752,646
Int. Cl. H04l *27/22;* H03d *3/18*
U.S. Cl. 329—50 5 Claims

ABSTRACT OF THE DISCLOSURE

A system for reconstituting a carrier reference signal from a received phase shift key (PSK) modulated carrier signal burst. The burst has a relatively short interval of unmodulated carrier followed by a longer interval of PSK modulated carrier. The system locks in phase during the unmodulated interval before switching to a frequency doubling mode for generating a reconstituted carrier signal from the modulated signal.

BACKGROUND OF THE INVENTION

Field of the invention

The invention concerns a demodulator system for a phase shift key (PSK) modulated carrier signal, and, more particularly, a system capable of receiving bursts of information on a PSK modulated carrier having a poor carrier to noise ratio (CNR) and of generating from these bursts a coherent output signal having low phase jitter.

Description of the prior art

The transmission devices presently in use in communication systems, such as satellite systems, transmit continuously, requiring constant use of power. Burst communication systems are an improvement over the continuous systems, in that they transmit only when information is to be sent. A burst system allows reduction in the amount of power required and allows more information channels for use of the same amount of power.

Both the prior art systems and the present invention transmit information on a PSK modulated carrier. A PSK modulated carrier contains information impressed upon the carrier in the form of changes of the relative phase of the carrier signal. As an example, if the data is in binary form, the carrier signal may have a relative phase of either 0° or 180°, thereby representing a binary 1 or a binary 0, respectively. PSK systems can also use more than two relative carrier phases for transmission of other than binary signals.

Demodulation of the PSK modulated carrier is accomplished by comparing the phase of the modulated carrier with that of a reference signal having the same frequency and phase as the unmodulated carrier. One difficulty in accomplishing such demodulation of PSK modulated carriers occurs because the coherent reference signal necessary for demodulation is not usually available, as such, at the receiver location. Although both the unmodulated carrier and the modulated carrier are available at transmitter, only the modulated carrier is transmitted to the receiver. Thus, to obtain an unmodulated carrier at the receiver for use as a reference signal, it is necessary to reconstitute an unmodulated carrier reference signal from the modulated carrier.

One prior art system for reconstituting the reference signal is shown in U.S. Pat. No. 3,119,964. In a system of the type shown in this patent, the PSK modulated signal is applied to a full-wave rectifier to generate a signal having a fundamental frequency equal to twice the carrier frequency. As an inherent result of the full-wave rectification process, the phase of the output signal from the full-wave rectifier is the same whether the carrier has a 0° phase shift or a 180° phase shift. This full-wave rectified signal is passed through a narrow band pass filter, having as a center frequency the second harmonic of the carrier frequency. The second harmonic signal is then passed through a frequency divider, to obtain a reference carrier frequency having the reference phase necessary for demodulating the modulated carrier. A detector compares the received modulated signal with this reconstituted reference signal to determine the relative phase shift.

Certain problems exist in the use of such a prior art system for poor CNR signals (that is, signals with a high noise level relative to the level of the signal). The process of doubling and filtering the modulated carrier signal causes a 12 db. degradation of the CNR. Such degradation will cause serious phase jitter of the reconstituted carrier reference signal if the CNR of the modulated carrier input signal is already low.

In another type of prior art system, the signal resulting from the rectifying and filtering process described, is applied to a phase lock loop. The phase lock loop improves the system stability by providing a reconstituted carrier with less noise. This system, using a phase lock loop, works quite well in the presently used PSK communication system, where the transmission of the PSK modulated carrier is continuous.

However, additional problems arise in the use of a burst communication system. Not only must the burst communication receiver be able to provide a reconstituted carrier reference signal free of substantial phase jitter, but it must be able to provide this reference signal rapidly. In any PSK communication receiver, the acquisition time is a measure of the time it takes for the receiver to lock onto the incoming carrier to provide a reconstituted carrier reference signal, usable in demodulating the PSK modulated carrier. In a continuous transmission system, the acquisition time is not particularly important, because of the long period of transmission following initial acquisition. However, in a burst communication receiver, each burst of communication requires a separate acquisition time. Even if the acquisition time for one burst of communication is the same as the acquisition time for a long continuous transmission of information, much more time will be spent in acquisition because of the greater number of acquisitions which take place in a burst communication system. In a burst transmission system, a fast acquisition time is necessary to conserve transmission power. With a fast acquisition time, the amount of power allocated in the burst to acquisition is small relative to the information carrying portion of the burst, thus allowing an efficient burst communication system.

To use the phase lock loop system mentioned above for reconstituting a carrier reference signal in a burst communication system, the system must be able to acquire a reconstituted carrier rapidly. One difficulty arises because, in the prior art device using the phase lock loop, the bandwidth of the phase lock loop must be a compromise value, especially where the carrier frequency is not precisely known. This bandwidth is controlled by a filter used in the phase lock loop. If the carrier frequency is not precisely known, such a loop filter must have a large bandwidth to allow fast acquisition of the carrier. A large bandwidth also allows the filter to pass more noise, thereby increasing the phase jitter of the reconstituted signal. Thus, fast acquisition time and low phase jitter are opposing requirements in such prior art systems. Such a prior art system is more fully described hereinafter in connection with FIG. 2.

Summary of the invention

The present invention is designed to receive a burst of PSK modulated carrier preceded by a short period of unmodulated carrier wave. This short period of unmodulated carrier wave, called the preamble, is typically about 1 msec. in length. Of course, the length of the PSK modulated burst depends upon the amount of information to be sent.

In the present invention, the phase lock loop within the carrier recovery system locks onto the carrier during the preamble. Because the preamble is unmodulated, no frequency doubling is required to recover the carrier.

The received carrier initially by-passes the frequency doubler and enters the phase lock loop. The signal into the loop during this initial time has a much higher carrier to noise ratio than it would have if first applied to the frequency doubler. When the phase lock loop locks onto the incoming carrier, a signal is generated indicating a lock condition. In response to the lock signal, the incoming carrier is applied to the frequency doubler prior to being applied to the phase lock loop, and the phase lock loop is altered to operate on the resulting doubled carrier frequency.

The phase lock loop includes a variable filter having a bandwidth which is varied in response to the lock signal. During the initial period of operation prior to lock-on, the filter has a relatively large bandwith, thereby allowing fast acquisition of the incoming carrier. When the phase lock loop locks onto the carrier, the filter is altered to have a relatively narrow bandwidth. The narrow bandwidth of the filter reduces the problem of phase jitter.

In the lock condition, the system is ready to demodulate the interval of phasee shift key (PSK) modulated carrier signal which follows the preamble.

Brief description of the drawings

FIG. 1 illustrates a PSK demodulator system. A received modulated carrier burst signal enters a band pass filter 1 which is tuned to pass only signals approximately of the carrier frequency. The output signal on line 2 from band pass filter 1 is divided into two identical components. One of these components is applied directly to the input of a demodulator stage 3. The other component is applied to the input of a carrier recovery unit 4. The carrier recovery unit generates, on line 5, an output signal which is the reconstituted carrier reference signal. Demodulator unit 3 compares the phase of the reconstituted carrier reference signal from line 5 with the phase of the modulated filtered carrier signal from line 2. A data output is provided from demodulator 3 on line 6 representing the phase difference between the reconstituted carrier reference signal and the modulated carrier signal.

FIG. 2 is a block diagram of a prior art carrier recovery unit. The modulated filtered carrier signal on line 2 from the band pass filter 1 passes through a conventional amplitude limiter 10 and enters a carrier frequency doubler 11. This frequency doubler is conventionally a full wave rectifier. The output signal from the frequency doubler passes through a band pass filter 12 having a center frequency equal to the second harmonic of the carrier frequency. The second harmonic signal from the band pass filter 12 is used to drive a phase lock loop 13. The phase lock loop provides an output signal on line 5 corresponding to the reconstituted carrier reference signal. The carrier recovery unit of FIG. 2 operates only with the frequency doubled carrier, and has the inherent problems resulting from the degradation of the CNR resulting from such frequency doubling.

FIG. 3 illustrates a carrier recovery unit according to the present invention. The carrier recovery unit of FIG. 3 includes a conventional limiter 10, a conventional carrier frequency doubler 11, and a conventional band pass filter 12 of the type described in connection with FIG. 2. The carrier recovery unit of FIG. 3 also includes a conventional band pass filter 20 tuned to the fundamental carrier frequency. A carrier switch means 21 has first and second input terminals connected respectively to receive the output signals from band pass filter 20 and from band pass filter 12. Carrier switch 21 is adapted to be switched by a switch signal on line 22 to alternatively connect the outputs from filters 12 and 20 to the output line 23. Thus, depending upon the condition of the carrier switch 21, the signal on line 23 may have a frequency of either the fundamental carrier frequency or the second harmonic of the carrier frequency. The signal on line 23 is connected to the input of a conventional limiter 24 to provide a limited signal on an output line 25 from the limiter. The signal on line 25 split into two identical components, one of which is applied to a phase lock loop 26 and the other of which is applied to the input of a lock detector 27.

Figure 1:
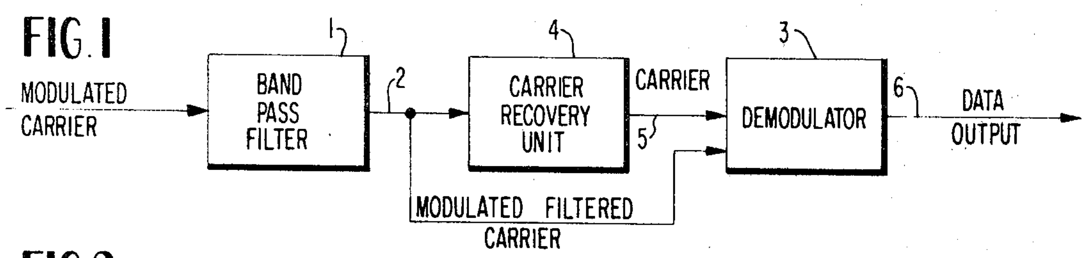
FIG. 1 is an overall block diagram of a PSK modulator system.
Figure 2:
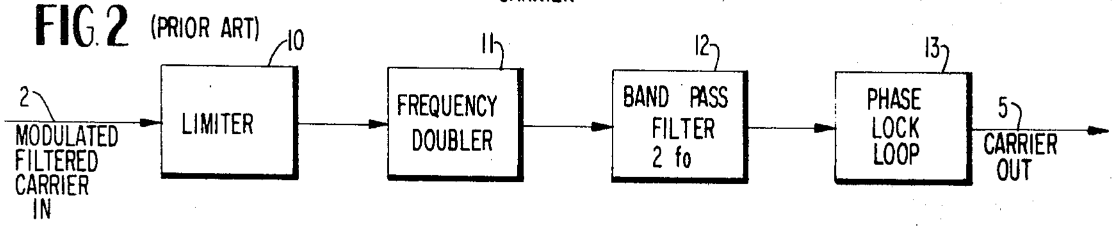
FIG. 2 (PRIOR ART)
FIG. 2 is a block diagram of a prior art carrier recovery unit for use in block 4 of the demodulator system of FIG. 1.

The phase lock loop 26, which is more completely illustrated and described in connection with FIG. 4, produces an output signal on line 5 having the same frequency and phase as the unmodulated carrier signal. After an initial period of inaccuracy during the attempt to lock, this signal on line 5 becomes a reconstituted carrier signal which is controlled in frequency and phase. Phase lock loop 26 also produces a signal on line 28 to lock detector 27. The lock detector is more fully illustrated and described in connection with FIG. 5. The signal on line 28 is controlled by internal switching within the phase lock loop, discussed more fully below. This signal has a frequency approximately proportional to the unmodulated carrier frequency before the lock condition occurs and has a frequency and phase proportional to the second harmonic of the carrier frequency after the lock condition occurs. Lock detector 27 compares the signals on lines 25 and 28 in a manner to be more fully described later, to determine if the lock condition has taken place. Upon detecting a lock condition, the lock detector generates switch signals 22 and 29. The switch signal on line 22 is applied to the carrier switch 21, thereby causing the carrier switch to connect the output from filter 12 to the output line 23.

Figures 3, 4:
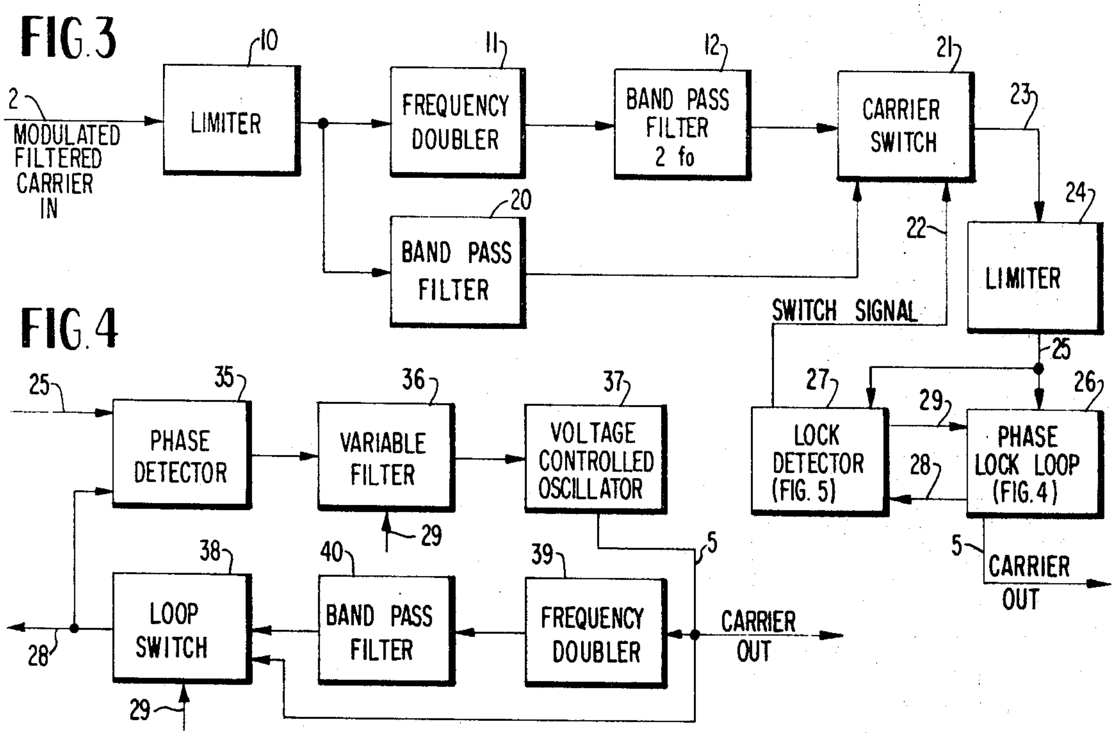
FIG. 3 is a block diagram of a carrier recovery unit according to the present invention for use in block 4 of the demodulator system of FIG. 1.
FIG. 4 is a block diagram of a phase lock lop for use in block 26 of the carrier recovery unit of FIG. 3.

Switch signal 29 is applied to the phase lock loop 26 to prepare the phase lock loop to operate with the frequency doubled carrier, in a manner to be described more completely in connection with FIG. 4.

FIG. 4 illustrates, in block form, a phase lock loop usable in block 26 of FIG. 3. Signals on lines 25 and 28 enter a conventional phase detector 35. During the first operation state when the carrier recovery unit has not locked onto the carrier, the signal on line 25 is derived through band pass filter 20 of FIG. 3.

During this initial operation state, the signal on line 25 is derived from the preamble of the burst and has a frequency equal to the fundamental carrier frequency. Later, after lock, the signal on line 25 is switched by the carrier switch 21, and is derived through band pass filter 12 of FIG. 3. Thus, after lock, the signal on line 25 to phase detector 35 has a frequency proportional to the second harmonic of the carrier signal. The signal on line 28 of phase detector 35 is a feedback signal, and is derived as explained below. Phase detector 35 provides an output signal which is proportional to the difference in phase between the signals on line 25 and line 28 and applies the output to a variable low pass filter 36. The variable low pass filter has a high upper cutoff frequency in the operation condition before lock occurs and has a lower upper cutoff frequency in the operation condition after lock occurs. The switching of low pass filter 36 is controlled by the signal on line 29 from lock detector 27. This switching signal 29 can operate, for example, a conventional switch to switch into or out of the circuit a resistive or capacitive element to vary the upper cutoff frequency.

The output signal from the low pass filter 36 is applied to the control terminal of a voltage controlled oscillator 37. The votage controlled oscillator generates an output signal on line 5 which has a high frequency controlled by the voltage on the control terminal. The signal from line 5 is applied to the demodulator 3 of FIG. 1 as the reconstituted carrier reference signal.

The signal on line 5 is also applied to the input terminals of a loop switch means 38, having a loop switch first input terminal, a loop switch second input terminal and a loop switch means output terminal. One component of the signal on line 5 is applied directly to the first input terminal of loop switch 38. Another identical component of the signal on line 5 is applied to the input terminal of a conventional loop frequency doubler 39. A signal from the output terminal of this frequency doubler, is applied to a conventional band pass filter 40 to produce a filter output signal having a frequency equal to the second harmonic of the voltage controlled oscillator output frequency. This filter output signal is applied to a second input terminal of loop switch 38. Switch 38 is controlled by the switch signal on line 29 from lock detector 27. In the operation condition before lock, the signal applied by switch 38 to line 28 is the fundamental frequency signal at its first input terminal. After lock, the signal on line 29 causes loop switch 38 to switch, thereby connecting the frequency doubled signal on its second input terminal to line 28.

Thus, it can be seen that during the initial operation condition, before lock has taken place, first switch 21 and second switch 38 each apply, via lines 25 and 28 a signal to phase detector 35 which has not been frequency doubled. Since the initial operation occurs during the time that the burst preamble is being received, frequency doubling is unnecessary to generate the reconstituted carrier. By avoiding frequency doubling during this time, the system also avoids the 12 db loss in CNR into the plase lock loop. After lock has taken place, switch signals 22 and 29 respectively cause switches 21 and 38 to apply frequency doubled signals via lines 25 and 28 to phase detector 35. Switching of switches 21 and 38 does not cause the voltage controlled oscillator to change the frequency of its output signal on line 5. The switching which occurs when the lock condition is established merely causes the phase detector 35 to stop comparing the phase of the two fundamental frequencies and to start comparing the phase of the two second harmonic signals. If the fundamental frequency signals are in phase, the second harmonic signals are also in phase. Except for a transient condition at the output of phase detector 35, there is no change in the resulting phase comparison signal from detector 35. Lock is not lost during the switching from the carrier frequency to the second harmonic of the carrier frequency, because the switching occurs so quickly that the inertia of the loop maintains the lock condition. The voltage at the control terminal of voltage control oscillator 37 can change very little during the instant of switching. Thus, the lock condition is maintained after the switching occurs. The phase lock loop is initially set up to compare the loop input signal derived from the preamble with the reconstituted carrier frequency. When the frequency and phase of the reconstituted carrier signal are very close to the frequency and phase of the preamble signal the lock detector generates switching signals, as described below. Upon being switched, the phase detector 35 begins comparing the second harmonic of the input signal with the second harmonic of the reconstituted carrier output signal. The phase lock loop is thus locked to the second harmonic of the input carrier signal after switching has taken place, thereby generating a reconstituted carrier signal having a frequency and phase equal to the unmodulated carrier signal.

The switch signal 29 which occurs at lock is also applied to variable low pass filter 36 to narrow the bandwidth of the loop, thereby reducing the possibility of the disturbance of the loop by noise. The reduction of the bandwidth of the loop has little effect upon the stability of the phase lock loop, because the phase lock loop has already locked onto the carrier frequency, and very small correction signals are needed to maintain this lock condition. The large loop bandwidth initially needed to provide fast acquisition is no longer needed after the lock condition is established.

Figure 5:
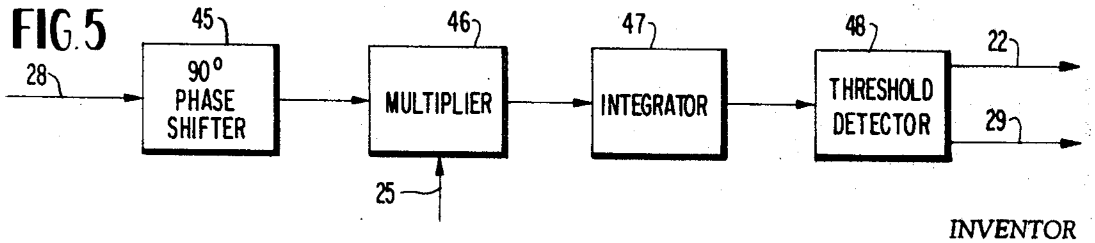
FIG. 5 is a block diagram of a lock detector for use in block 27 of the carrier recovery unit of FIG. 3.

FIG. 5 illustrates, in block form, an example of a lock detector which may be used in block 27 of FIG. 3. The signal on line 28 from switch 38 in FIG. 4 is applied to a 90° phase shifter 45. The phase shifted signal from phase shifter 45 is applied to one input terminal of a multiplier 46. The signal on line 25 from limiter 24 and switch 21 is applied to another input of multiplier 46. The output signal from multiplier 46 is proportional to the product of the two input signals and is applied to integrator 47. Integrator 47 integrates the multiplier output signal and provides an output signal which is applied to a threshold detector 48. If the input signal to threshold detector 48 is above a predetermined threshold value, indicating that the signals on lines 22 and 29 are in phase, the lock detector generates signals on lines 22 and 29 to indicate a lock condition and to cause the switching described above. The signal on line 22 is applied to carrier switch 21 in FIG. 3. The signal on line 29 is applied to the phase lock loop 26 of FIG. 3, and, more particularly, to the variable low pass filter 36 and the loop switch 38 of FIG. 4. Each of the switches 21 and 38 may be any type of switch, many of which are well known in the art, which has two input terminals that are alternately connected to a single output terminal under control of a control or switch signal. As an example, solid state switches may be used.

While the invention has been particularly shown and described with reference to a preferred embodiment thereof, it will be understood by those skilled in the art that various changes in form and details may be made therein without departing from the spirit and scope of the invention.

What is claimed is:

1. A system for generating a reference carrier in response to a received carrier burst signal, said received signal having an interval of unmodulated carrier followed by an interval of phase shift key modulated carrier, comprising:

(a) oscillator means for generating a reference carrier, the frequency and phase of which are controlled by a control signal applied thereto, (b) phase detector means having first and second inputs for providing said control signal as an output signal related to the phase difference of the signals applied to said first and second inputs, (c) means for applying said control signal to said oscillator means, (d) means for applying said reference carrier to the first input of said phase detector means during a first operation state and for applying the second harmonic of said reference carrier to the first input of said phase detector means during a second operation state, (e) means for applying said received carrier burst signal to the second input of said phase detector means during said first operation state and for applying the second harmonic of said received carrier burst signal to the second input of said phase detector means during said second operation state, and (f) means for comparing the phase of said input signals to said phase detector means to place said system in the first operation state when said input signals are not in phase and to switch said system into the second operation state when said input signals are substantially in phase, whereby a coherent reference carrier is generated during said second operation state.

2. A system according to claim 1 wherein said means for applying said control signal to said oscillator means comprises variable low-pass filter means having a first upper cutoff frequency during said first operation state and a second upper cutoff frequency during said second operation state, said second upper cutoff frequency being lower than said first upper cutoff frequency.

3. A system according to claim 2 wherein said means for applying said received carrier burst signal comprises:

(a) carrier frequency-doubler means connected to receive said carrier burst signal for generating a second harmonic of said received carrier burst signals at an output thereof, (b) a first band pass filter centered at said second harmonic and having an input and an output, said input being connected to the output of said carrier frequency-doubler means, (c) a second band pass filter centered at the frequency of said received carrier burst signal and having an input and an output, said input being connected to receive said carrier burst signal, and (d) carrier switching means connected to the outputs from said band pass filters and responsive to said comparing means, for connecting the output of said second band pass filter to the second input of said phase detector means during said first operation state, and for connecting the output of said first band pass filter to the second input of said phase detector means during said second operation state.

4. A system according to claim 3 wherein said means for applying said reference carrier comprises:

(a) loop frequency-doubler means connected to receive said reference carrier for generating a second harmonic of said reference carrier at an output thereof, (b) a third band pass filter centered at said second harmonic and having an input and an output, said input being connected to the output of said loop frequency-doubler means, (c) loop switching means connected to the output from said third band pass filter and to the reference carrier output from said oscillator means and responsive to said comparing means for connecting carrier output to the first input of said phase detector means during said first operation state, and for connecting the output of said third band pass filter to the first input of said phase detector during said second operation state.

5. A system according to claim 2 wherein said means for applying said reference carrier comprises:

(a) loop frequency-doubler means connected to receive said reference carrier for generating a second harmonic of said reference carrier at an output thereof, (b) a band pass filter centered at said second harmonic and having an input and an output, said input being connected to the output of said loop frequency-doubler means, (c) loop switching means connected to the outputs from said band pass filter and to the reference carrier output from said oscillator means and responsive to said comparing means for connecting said reference carrier output to the first input of said phase detector means during said first operation state, and for connecting the output of said band pass filter to the first input of said phase detector during said second operation state.

References Cited

UNITED STATES PATENTS

| | | | |
|---|---|---|---|
| 3,199,037 | 8/1965 | Graves | 329—122 |
| 3,401,353 | 9/1968 | Hughes | 331—25 X |
| 3,402,265 | 9/1968 | Couvillon | 325—30 X |
| 3,440,540 | 4/1969 | Hane et al. | 325—30 X |

ALFRED L. BRODY, Primary Examiner

U.S. Cl. X.R.

329—122; 331—25; 325—30, 320, 419; 178—66